Patented Apr. 4, 1939

2,152,652

UNITED STATES PATENT OFFICE 2,152,652

METALLIFEROUS AZO DYES

Werner Lange, Dessau-Ziebigk in Anhalt, Germany, assignor to General Aniline Works, Inc., New York, N. Y., a corporation of Delaware No Drawing. Application June 25, 1937, Serial No. 150,325. In Germany July 2, 1936

10 Claims. (Cl. 260—145)

My present invention relates to new azo dyes and more particularly to metalliferous polyazo dyes.

By this invention dyes which are particularly suitable for dyeing chrome leather and vegetable tanned leather are made by coupling a diazotized 1-amino-8-hydroxynaphthalene sulfonic acid with a 1,3-dihydroxy compound of the benzene series capable of double coupling, causing an ortho-hydroxy-diazo compound to react with the monoazo dye thus obtained, and then coupling with a third molecule of any desired diazo compound to produce a trisazo dye and finally converting this tris- or polyazo dye into a metal compound. Suitable metals for making this compound are copper, iron, nickel, manganese, chromium, cobalt and aluminum. The order in which the coupling operations are performed may be conducted in the reverse way. Especially valuable on account of their color tone and their superior fastness to light are the metalliferous azo dyes obtained with use of 1,3-hydroxybenzenes as component.

The dyes dye chrome leather and vegetable tanned leather beautiful red-brown to dark-brown level tints which are of especially good fastness to acids, alkalies and light.

As compared with the known metalliferous dyes of similar composition in which instead of the diazotized 1-amino-8-hydroxynaphthalene sulfonic acid other diazo compounds are used, the new dyes are distinguished by the improved fastness to light of their dyeings and their beautiful tints.

As compared with similarly composed dyes which are free from metal the new dyes are also distinguished by the improved fastness to light of their dyeings on leather.

The following examples illustrate the invention, the parts being by weight:

*Example 1.*—34.1 parts of 1-amino-8-hydroxynaphthalene-3,6-disulfonic acid (acid sodium salt) are diazotized in known manner and coupled with a solution kept alkaline of 11 parts of 1,3-dihydroxybenzene. To this monoazo dye, also in a medium kept alkaline, there is added the diazo compound prepared from 15.4 parts of 4-nitro-2-amino-1-hydroxybenzene. To this disazo dye there is added in the presence of caustic soda lye a further molecule of the diazo compound from 15.4 parts of 4-nitro-2-amino-1-hydroxybenzene; when coupling is complete 22 parts of sodium carbonate are added and the whole is heated for about 1 hour at 80° C. with a solution of 50 parts of crystallized copper sulfate which has been supersaturated with ammonia. The dye is separated in the usual manner. It dyes leather even, clear, red-brown tints of excellent fastness to alkali acid and light.

*Example 2.*—The trisazo dye prepared as described in Example 1 is boiled with 40 parts of potassium chromate for 12 hours under reflux; the dye is then salted out from a neutral solution with common salt. It dyes leather tints similar to those produced by the products of Example 1 and of equally good properties of fastness.

*Example 3.*—34.1 parts of 1-amino-8-hydroxynaphthalene-3,6-disulfonic acid (acid sodium salt) are diazotized and coupled in alkaline solution with 11 parts of 1.3-dihydroxybenzene; the monoazo dye is coupled in alkaline solution with the diazo compound produced from 23.4 parts of 6-nitro-2-amino-1-hydroxybenzene-4-sulfonic acid. When coupling is complete there is run in in presence of sodium hydroxide a diazo compound prepared from 15.4 parts of 4-nitro-2-amino-1-hydroxybenzene. The finished dye is heated for about 24 hours at 100° C. with 12 parts of sodium carbonate and 50 parts of chrome alum. The chromed dye is so freely soluble that it must be separated by evaporating the solution. It dyes chrome calf and tanned sheep skins violet-brown tints of very good properties of fastness.

In the foregoing examples the metallic complex compound may be formed at an earlier stage in constructing the dye, for example the disazo dye may be treated with the agent yielding metal and afterwards coupled with a further diazo component.

*Example 4.*—To the disazo dye prepared as described in Example 1 from diazotized 1-amino-8-hydroxynaphthalene-3.6-disulfonic acid, 1.3-dihydroxybenzene and 4-nitro-2-amino-1-hydroxybenzene which has been converted into its complex copper compound there is added an alkaline solution prepared by diazotizing 4'-nitro-4-aminodiphenylamine-2'-sulfonic acid. The diazo compound is immediately taken up from the dye. The finished dye is separated by addition of common salt. It dyes chrome calf and vegetable tanned leather brown tints which are essentially more yellow than those produced with the dye prepared according to Example 1.

*Example 5.*—The monoazo dye from 1-amino-8-hydroxynaphthalene-3.6-disulfonic acid and 1,3-dihydroxybenzene is prepared as indicated in Example 1. To the alkaline solution of this dye there is added the diazo compound of 19.9 parts of 2-amino-1-hydroxy-4,6-dinitrobenzene. The disazo dye thus obtained is coupled furthermore in a neutral or weakly acid solution with the diazo compound prepared from 13.8 parts of 1-amino-4-nitrobenzene. Then the dye is treated in a soda alkaline solution while heating with a solution of 10.85 parts of ferric chloride and the complex ferric compound thus formed is separated as usual by addition of common salt. It dyes leather dark-brown tints.

Instead of 1-amino-8-hydroxynaphthalene-3,6-disulfonic acid in the Examples 1 to 5 other peri-aminohydroxynaphthalene sulfonic acids may be used with like effect, for instance 1-amino-8-hydroxynaphthalene-4,6-disulfonic acid, 1-amino-8-hydroxynaphthalene-4-sulfonic acid, 1-amino-8-hydroxynaphthalene-2,4-disulfonic acid; the 4-nitro-2-amino-1-hydroxybenzene as second component may be exchanged for another ortho-amino-hydroxybenzene or ortho-amino-hydroxynaphthalene, for example 2-amino-1-hydroxybenzene, 4,6-dinitro- or dichloro-2-amino-1-hydroxybenzene, 4-chloro-2-amino-1-hydroxybenzene or 1-amino-2-hydroxynaphthalene-4-sulfonic acid; finally in the third place any diazo compound may be coupled, for instance diazotized aminobenzene, 4-nitro-1-aminobenzene, 1-aminobenzene-4-sulfonic acid, 4-aminoazobenzene-4'-sulfonic acid, an aminonaphthalene sulfonic acid or the like without essential variation in the properties of the finished dye.

In order to form the metalliferous complex compounds, other metal salts of the metals mentioned above may be used. These processes for forming metal-containing dyes are well known in the art.

What I claim is:

1. The metalliferous azo dyes which correspond to the general formula

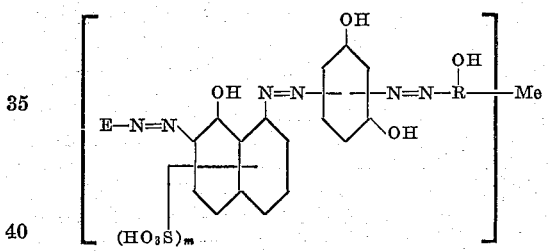

wherein R is a radicle of the group consisting of radicles of the benzene and naphthalene series, in which the OH group is in ortho-position to the azo bridge, E is a radicle of the group consisting of radicles of the benzene and naphthalene series, and M is one of the integers 1 and 2, Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalies and light.

2. The metalliferous azo dyes which correspond to the general formula

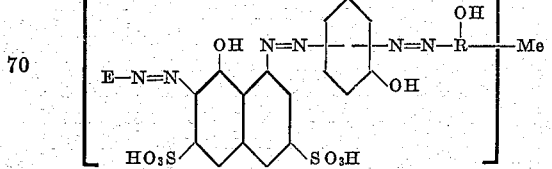

wherein R is a radicle of the group consisting of radicles of the benzene and naphthalene series, in which the OH group is in ortho-position to the azo bridge, E is a radicle of the group consisting of radicles of the benzene and naphthalene series, and Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalies and light.

3. The metalliferous azo dyes which correspond to the general formula

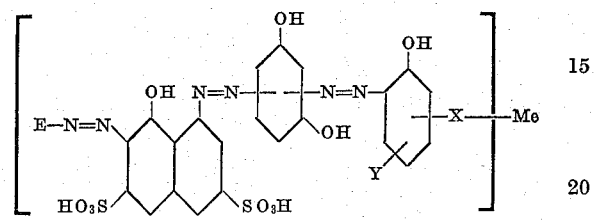

wherein E is a radicle of the group consisting of radicles of the benzene and naphthalene series, X and Y mean a radicle selected from the group consisting of hydrogen, halogen and nitro, and Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalies and light.

4. The metalliferous azo dyes which correspond to the general formula

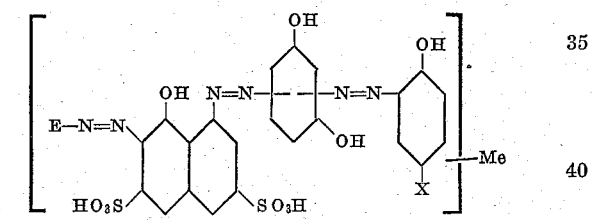

wherein E is a radicle of the group consisting of radicles of the benzene and naphthalene series, X means a radicle selected from the group consisting of hydrogen, halogen and nitro, and Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalies and light.

5. The metalliferous azo dyes which correspond to the general formula

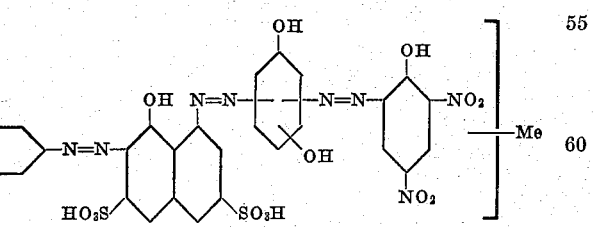

wherein Me means a heavy metal of the group consisting of chromium, copper, manganese, iron, nickel, cobalt and aluminum, said dyes dyeing chrome leather and vegetable tanned leather beautiful red-brown to dark-brown level tints of good fastness to acids, alkalines and light.

6. The process which comprises diazotizing a 1-amino-8-hydroxynaphthalene sulfonic acid, coupling the diazo compound with 1.3-dihydroxybenzene, diazotizing an amine of the group consisting of 1-hydroxy-2-aminobenzenes and 1-hydroxy-2-aminonaphthalenes, coupling this diazo compound with the dye previously formed, acting upon the dye with a third diazo compound, and treating the polyazo dye thus obtained with a metal compound of the group consisting of chromium, copper, manganese, iron, nickel, cobalt and aluminum salts.

7. The process which comprises diazotizing a 1 - amino- 8 -hydroxynaphthalene- 3.6 -disulfonic acid, coupling the diazo compound with 1.3-dihydroxybenzene, diazotizing an amine of the group consisting of 1-hydroxy-2-aminobenzenes and 1-hydroxy-2-aminonaphthalenes, coupling this diazo compound with the dye previously formed acting upon the dye with a diazotized nitroamino compound of the benzene series, and treating the polyazo dye thus obtained with a metal compound of the group consisting of chromium, copper, manganese, iron, nickel, cobalt and aluminum salts.

8. The process which comprises diazotizing 1 - amino- 8 -hydroxynaphthalene- 3.6 -disulfonic acid, coupling the diazo compound with 1.3-dihydroxynaphthalene, diazotizing an amine of the general formula

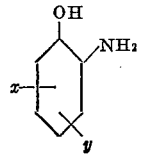

wherein $x$ and $y$ mean a radicle selected from the group consisting of hydrogen, methyl, halogen, $SO_3H$, and nitro, coupling this diazo compound with the dye previously formed acting upon the dye with a diazotized nitroamino compound of the benzene series, and treating the polyazo dye thus formed with a metal compound of the group consisting of chromium, copper, manganese, iron, nickel, cobalt and aluminum salts.

9. The process which comprises diazotizing 1 - amino- 8 -hydroxynaphthalene- 3.6 -disulfonic acid, coupling the diazo compound with 1.3-dihydroxynaphthalene, diazotizing 1-hydroxy-2-amino-4-nitrobenzene, coupling this diazo compound with the dye previously formed acting upon the dye with a diazotized nitroamino compound of the benzene series, and treating the polyazo dye thus formed with ferric chloride.

10. The process which comprises diazotizing 1 - amino- 8 -hydroxynaphthalene- 3.6 -disulfonic acid, coupling the diazo compound with 1.3-dihydroxynaphthalene, diazotizing 1-hydroxy-2-amino-4.6-dinitrobenzene, coupling this diazo compound with the dye previously formed, acting upon the disazo dye with diazotized 1-amino-4-nitrobenzene and treating the polyazo dye thus formed with ferric chloride.

WERNER LANGE.